United States Patent
Miyamoto

(10) Patent No.: US 11,835,800 B2
(45) Date of Patent: Dec. 5, 2023

(54) SPECTACLE LENS

(71) Applicant: HOYA LENS THAILAND LTD., Pathumthani (TH)

(72) Inventor: Sou Miyamoto, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 349 days.

(21) Appl. No.: 17/279,906

(22) PCT Filed: Sep. 27, 2019

(86) PCT No.: PCT/JP2019/038102
§ 371 (c)(1),
(2) Date: Mar. 25, 2021

(87) PCT Pub. No.: WO2020/067408
PCT Pub. Date: Apr. 2, 2020

(65) Prior Publication Data
US 2021/0397021 A1     Dec. 23, 2021

(30) Foreign Application Priority Data

Sep. 28, 2018 (JP) .................. 2018-184883

(51) Int. Cl.
*G02C 7/02* (2006.01)
*G02C 7/10* (2006.01)
*G02B 1/18* (2015.01)

(52) U.S. Cl.
CPC ............. *G02C 7/024* (2013.01); *G02C 7/102* (2013.01); *G02C 7/104* (2013.01); *G02B 1/18* (2015.01)

(58) Field of Classification Search
CPC ........ G02C 7/024; G02C 7/102; G02C 7/104; G02C 7/107; G02C 7/10; G02B 1/18; G02B 5/285; G02B 5/26; G02B 5/28
See application file for complete search history.

(56) References Cited

U.S. PATENT DOCUMENTS 9,389,435 B2   7/2016   De Ayguavives et al.
2015/0234209 A1   8/2015   Miyamoto et al.
(Continued)

FOREIGN PATENT DOCUMENTS

EP   2602654 A1   6/2013
EP   3229060 A1   10/2017
(Continued)

OTHER PUBLICATIONS

Machine translation of WO-2017171075-A1 (Year: 2017).*
(Continued)

*Primary Examiner* — Darryl J Collins
*Assistant Examiner* — Matthew Y Lee
(74) *Attorney, Agent, or Firm* — Kilpatrick Townsend & Stockton LLP

(57) ABSTRACT

Provided is a spectacle lens including multilayer films on both surfaces of a lens substrate, in which the sum of mean reflectances on both surfaces of the spectacle lens in a wavelength band of 400 to 440 nm is 20.0% or more, the reflectance on each surface of the spectacle lens has at least one maximum value in the wavelength band, and there is a difference between the mean reflectance on one surface of the spectacle lens and the mean reflectance on the other surface in the wavelength band.

7 Claims, 1 Drawing Sheet

(56) References Cited

U.S. PATENT DOCUMENTS

2017/0299896 A1 10/2017 Ogo et al.
2018/0341122 A1 11/2018 Shioya et al.

FOREIGN PATENT DOCUMENTS

| JP | 2012093639 A | 5/2012 | | |
|---|---|---|---|---|
| JP | 7136908 B2 | 9/2022 | | |
| WO | 2016088763 A1 | 6/2016 | | |
| WO | WO-2016088763 A1 * | 6/2016 | ............. | G02B 1/115 |
| WO | 2017090128 A1 | 6/2017 | | |
| WO | 2017171075 A1 | 10/2017 | | |
| WO | WO-2017171075 A1 * | 10/2017 | ............... | B32B 7/02 |

OTHER PUBLICATIONS

Machine translation of WO-2016088763-A1 (Year: 2016).*
EP19864195.3, "Extended European Search Report", dated May 31, 2022, 9 pages.
PCT/JP2019/038102, English Translation of International Search Report, dated Dec. 17, 2019, 2 pages.
PCT/JP2019/038102, "International Preliminary Report on Patentability", dated Apr. 8, 2021, 7 pages.
Torii et al., "Violet Light Exposure Can Be a Preventive Strategy Against Myopia Progression", EBioMedicine 15, 2017, 210-219.

* cited by examiner

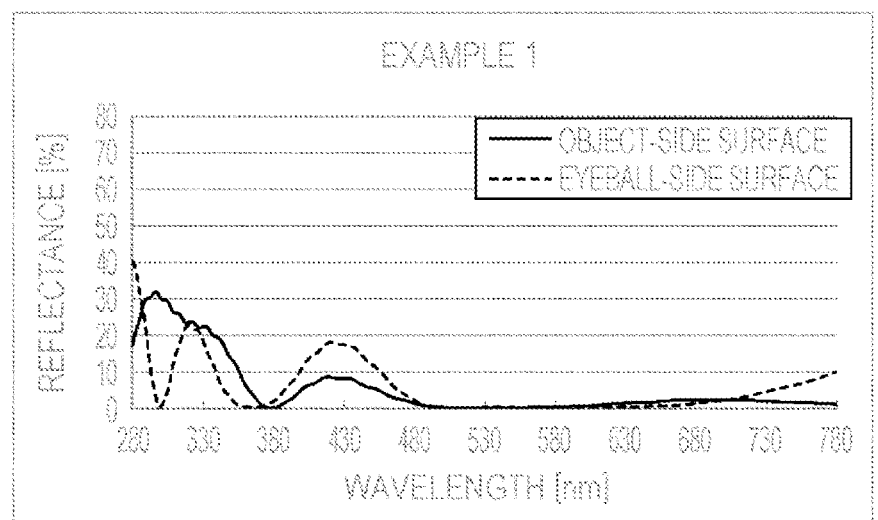

SPECTACLE LENS

CROSS-REFERENCE TO RELATED APPLICATIONS

This application is the National Stage of International Application No. PCT/JP2019/038102, filed on Sep. 27, 2019, which claims priority to Japanese Patent Application No. 2018-184883, filed on Sep. 28, 2018, and the contents of which is incorporated by reference.

TECHNICAL FIELD

The present disclosure relates to a spectacle lens.

BACKGROUND ART

Patent Literature 1 describes a spectacle lens that suppresses entering of light in a blue region of visible light into the eye of a wearer of the spectacle lens. Patent Literature 1 describes that the wavelength in the blue region to be blocked is 380 to 500 nm. Strictly speaking, the wavelength of purple is 380 to 450 nm, and the wavelength of blue is 450 to 500 nm.

The spectacle lens described in Patent Literature 1 is an optical component including a plastic substrate and a multilayer film disposed on at least a convex surface out of both surfaces consisting of the convex surface and a concave surface of the plastic substrate, and the multilayer film has a mean reflectance of 2 to 10% in a wavelength range of 400 to 500 nm ([0008] of Patent Literature 1).

CITATION LIST

Patent Literature

Patent Literature 1: JP 2012-93639 A

SUMMARY OF DISCLOSURE

Technical Problem

The spectacle lens described in Patent Literature 1 blocks light in the blue region by increasing a reflectance for light in the blue region. Therefore, the spectacle lens is also called a blue-cut lens. Meanwhile, according to studies by the present inventor, it has become clear that reflected light in the blue region that has been multiple-reflected in the lens may enter the eye of a wearer although a conventional blue-cut lens bears the name of blue-cut.

An aspect of an embodiment of the present disclosure is to provide a blue-cut lens in which light including reflected light is cut.

Solution to Problem

The present inventor made intensive studies in order to solve the above problems. As a result, the present inventor has found that the above problem can be solved by imparting blue-cut function (reflectance) to each of multilayer films on both surfaces of the spectacle lens, using multilayer films having the same tendency of the blue-cut function in a relationship between wavelength and reflectance for both surfaces of the spectacle lens, and providing a difference between the height of the blue-cut function of one surface and the height of the blue-cut function of the other surface.

The present disclosure has been found based on the above findings.

A first aspect of the present disclosure is a spectacle lens including multilayer films on both surfaces of a lens substrate, in which the sum of mean reflectances on both surfaces of the spectacle lens in a wavelength band of 400 to 440 nm is 20.0% or more, the reflectance on each surface of the spectacle lens has at least one maximum value in the wavelength band, and there is a difference between the mean reflectance on one surface of the spectacle lens and the mean reflectance on the other surface in the wavelength band.

A second aspect of the present disclosure is the aspect according to the first aspect, in which a ratio of the mean reflectance on one surface of the spectacle lens to the mean reflectance on the other surface is more than 0 and 0.9 or less in the wavelength band.

A third aspect of the present disclosure is the aspect according to the first or second aspect, in which the mean reflectance on the object-side surface of the spectacle lens is less than the mean reflectance on the eyeball-side surface in the wavelength band.

A fourth aspect of the present disclosure is the aspect according to any one of the first to third aspects, in which the sum of mean reflectances on both surfaces of the spectacle lens in a wavelength band of 500 to 570 nm is 1.0% or less.

A fifth aspect of the present disclosure is the aspect according to any one of the first to fourth aspects, in which the sum of luminous reflectances on both surfaces of the spectacle lens is 2.0% or less.

A sixth aspect of the present disclosure is the aspect according to the fifth aspect, in which the sum of the largest maximum values out of the reflectances on both surfaces of the spectacle lens is 60.0% or less.

A seventh aspect of the present disclosure is the aspect according to any one of the first to sixth aspects, in which a multilayer film on each surface of the spectacle lens includes one or more high refractive index layers and one or more low refractive index layers, and the total number of layers is 10 or less.

Other aspects that can be combined with the above aspects are listed below.

An eighth aspect of the present disclosure is the aspect according to any one of the first to seventh aspects, in which the sum of the mean reflectances on both surfaces of the spectacle lens in a wavelength band of 500 to 570 nm is preferably less than 1.0%, and more preferably 0.5% or less.

A ninth aspect of the present disclosure is the aspect according to any one of the first to eighth aspects, in which the sum of luminous reflectances on both surfaces of the spectacle lens is preferably less than 2.0%, and more preferably 1.8% or less.

A tenth aspect of the present disclosure is the aspect according to any one of the first to ninth aspects, in which when a running mean of reflectances at 10 points before and after predetermined point a (that is, 21 points in total including point a) in plots between wavelength (horizontal axis) and reflectance (vertical axis) is taken, and the plots are smoothed by using the running mean value as a new reflectance at point a, the reflectance on each surface of the spectacle lens preferably has at least one maximum value in a wavelength band of 400 to 440 nm.

An eleventh aspect of the present disclosure is the aspect according to any one of the first to tenth aspects, in which a maximum value in the wavelength band of 400 to 440 nm (the largest maximum value when there is a plurality of maximum values) is preferably also a maximum value in the wavelength band of 400 to 440 nm.

A twelfth aspect of the present disclosure is the aspect according to any one of the first to eleventh aspects, in which a multilayer film on each surface of the spectacle lens includes one or more high refractive index layers and one or more low refractive index layers, and the total number of layers is preferably 9 or less, and more preferably 8 or less.

A thirteenth aspect of the present disclosure is the aspect according to any one of the first to twelfth aspects, in which the sum of the mean reflectances on both surfaces of the spectacle lens in a wavelength band of 400 to 440 nm is 20.0% or more, preferably more than 20.0%, and more preferably 25% or more.

A fourteenth aspect of the present disclosure is the aspect according to any one of the first to thirteenth aspects, in which the sum of the mean reflectances on both surfaces of the spectacle lens in a wavelength band of 360 to 400 nm is 6.0% or less, preferably less than 6.0%, and more preferably 5.0% or less.

A fifteenth aspect of the present disclosure is the aspect according to any one of the first to fourteenth aspects, in which the sum of the mean reflectances on both surfaces of the spectacle lens in a wavelength band of 480 to 680 nm is 2.0% or less, preferably less than 2.0%, and more preferably 1.5% or less.

A sixteenth aspect of the present disclosure is the aspect according to any one of the first to fifteenth aspects, in which a ratio of the mean reflectance on one surface of the spectacle lens to the mean reflectance on the other surface is 0.3 (or 0.4) to 0.9 in a wavelength band of 400 to 440 nm.

A seventeenth aspect of the present disclosure is the aspect according to any one of the first to sixteenth aspects, in which a ratio of the mean reflectance on one surface of the spectacle lens to the mean reflectance on the other surface is more than 0 and less than 0.3 (preferably less than 0.4) in a wavelength band of 400 to 440 nm.

An eighteenth aspect of the present disclosure is the aspect according to any one of the first to the seventeenth aspects, in which a ratio of the mean reflectance on one surface of the spectacle lens to the mean reflectance on the other surface is more than 0.9 and less than 1.0 in a wavelength band of 400 to 440 nm.

Advantageous Effects of Disclosure

According to an embodiment of the present disclosure, it is possible to provide a blue-cut lens in which light including reflected light is cut.

BRIEF DESCRIPTION OF DRAWINGS

FIG. 1 is a diagram illustrating spectral reflection spectra obtained by measurement on an object-side surface and an eyeball-side surface of a spectacle lens of Example 1.

DESCRIPTION OF EMBODIMENTS

A mean reflectance in the present disclosure and the present specification means an arithmetic mean value of normal incidence reflectances measured for each arbitrary wavelength (with an arbitrary pitch) in a wavelength range to be measured at the optical center of a surface to be measured. For the measurement, a measurement wavelength interval (pitch) can be arbitrarily set in a range of, for example, 1 to 5 nm. A reflection spectral characteristic such as a reflectance in the present disclosure and the present specification means a normal incidence reflection spectral characteristic. "Luminous reflectance" is measured in accordance with JIS T 7334:2011.

In the present disclosure and the present specification, "eyeball-side surface" means a surface disposed on an eyeball side and "object-side surface" means a surface disposed on an object side when a wearer wears spectacles including a spectacle lens.

In the present specification, "to" refers to a predetermined value or more and a predetermined value or less.

Hereinafter, an embodiment of the present disclosure will be described.

[Spectacle Lens According to an Aspect of the Present Disclosure]

A spectacle lens according to an aspect of the present disclosure is a spectacle lens including multilayer films on both surfaces of a lens substrate, in which the sum of mean reflectances on both surfaces of the spectacle lens in a wavelength band of 400 to 440 nm is 20.0% or more, the reflectance on each surface of the spectacle lens has at least one maximum value in the wavelength band, and there is a difference between the mean reflectance on one surface of the spectacle lens and the mean reflectance on the other surface in the wavelength band.

The reflectance on each surface of the spectacle lens as at least one maximum value in a wavelength band of 400 to 440 nm. This maximum value is also preferably a maximum value in the wavelength band of 400 to 440 nm. The requirement related to the maximum value indicates that blue-cut function having the same tendency in a relationship between wavelength and reflectance (for example, when the horizontal axis indicates wavelength (nm) and the vertical axis indicates reflectance (%), plots between wavelength and reflectance macroscopically draw a convex shape upward) is imparted to the multilayer films on both surfaces. By meeting this requirement, the effect of blocking light in the blue region is ensured because light in the wavelength band of 400 to 440 nm is effectively reflected on the multilayer films on both surfaces. In addition, as illustrated in Examples described later, it is also possible to ensure transmission of visible light favorably.

By the way, in order to specify that the plots between wavelength and reflectance macroscopically draw a convex shape upward, a requirement that smoothed plots in the wavelength band of 400 to 440 nm in the plots between wavelength and reflectance have at least one (for example, one) maximum value may be provided. This smoothing may be performed, for example, by taking a running mean of reflectances at 10 points before and after predetermined point a in the plots (that is, 21 points in total including point a), and using the running mean value as a new reflectance at point a. As a result, it is possible to exclude a case where there is a plurality of maximum values due to fine vibration in the plots, and to specify that the plots between wavelength and reflectance macroscopically draw a convex shape upward.

In addition to the requirement related to the maximum value, a difference is provided between the mean reflectance on one surface of the spectacle lens and the mean reflectance on the other surface in the wavelength band. As a result, it is not necessary to multiple-reflect reflected light in the blue region in the lens, or even when the reflected light is multiple-reflected, a wearer hardly recognizes the multiple-reflected light.

According to an aspect of the present disclosure, it is possible to provide a blue-cut lens in which light including reflected light is cut.

[Preferable Example of Spectacle Lens According to an Aspect of the Present Disclosure]

Hereinafter, a preferred example of an aspect of the present disclosure will be described, and details of the configuration of the spectacle lens according to an aspect of the present disclosure will be described.

The sum of the mean reflectances on both surfaces of the spectacle lens in a wavelength band of 500 to 570 nm is preferably 1.0% or less (preferably less than 1.0%, more preferably 0.5% or less). Light in the wavelength band of 500 to 570 nm is green light. According to the above requirement, it is possible to suppress reflection of green light, which largely contributes to a luminous reflectance.

The sum of the luminous reflectances on both surfaces of the spectacle lens is preferably 2.0% or less (preferably less than 2.0%, more preferably 1.8% or less). According to the above requirement, it is possible to suppress occurrence of glare due to reflected light in the spectacle lens.

The sum of the maximum values (the largest maximum values when there is a plurality of maximum values) out of the reflectances on both surfaces of the spectacle lens in the wavelength band of 400 to 440 nm is preferably 60.0% or less. According to this requirement, as described in the section of Technical Problem, it is possible to suppress the tendency that a reflectance for visible light outside the blue region also tends to be high by increasing a reflectance for light in the blue region. As a result, transmission of visible light can be ensured favorably.

In order to more effectively receive an advantage that it is not necessary to multiple-reflect reflected light in the blue region in the lens, or even when the reflected light is multiple-reflected, a wearer hardly recognizes the multiple-reflected light, the following configuration is preferably adopted. That is, in the wavelength band of 400 to 440 nm, a ratio of the mean reflectance on one surface of the spectacle lens (a surface having an equal or lower mean reflectance, the object-side surface in Example 1 described later) to the mean reflectance on the other surface (a surface having a higher mean reflectance, the eyeball-side surface in Example 1 described later) is preferably 0.3 (preferably 0.4) to 0.9. As described above, among rays in the blue region, rays in the purple region should be particularly blocked. This is why the sum of the mean reflectances on both surfaces is set to a value of 20.0% or more in the purple region. Therefore, by keeping the ratio of the mean reflectance between both surfaces in the purple region to 0.3 to 0.9, it is possible to suppress in advance that transmission of visible light is affected by a particularly high reflectance on one surface.

By the way, by setting the ratio of the mean reflectance to a value of more than 0 and less than 0.3 (or less than 0.4) in the wavelength band of 400 to 440 nm, the multiple-reflected light in the blue region can be more reliably eliminated. Within this range, the effect of blocking light in the blue region is reduced on one surface of the spectacle lens. In other words, it is possible to impart a function or characteristic other than the blocking effect to the multilayer film on the one surface. For example, a characteristic of further reducing the luminous reflectance may be imparted to the multilayer film on the one surface.

On the contrary, by setting the ratio of the mean reflectance to a value of more than 0.9 and less than 1.0, the color and the reflection intensity of reflected light on one surface look the same as the color and the reflection intensity of reflected light on the other surface, respectively. Therefore, an appearance is more unified and better.

That is, the ratio of the mean reflectance only needs to be selected depending on which of the above-listed advantages is adopted. In other words, in an aspect of the present disclosure, there is a degree of freedom for which of the above-listed advantages is adopted.

Note that in Example 1 described later, the mean reflectance on the object-side surface is set so as to be less than the mean reflectance on the eyeball-side surface in a wavelength band of 400 to 440 nm. By suppressing the mean reflectance on the object-side surface in this wavelength band, glaring feeling when the spectacle lens is viewed by a third party facing the front of a wearer of the spectacle lens is suppressed. That is, there is an advantage that a visual aspect (that is, appearance) viewed by others is improved. On the contrary, when the mean reflectance on the eyeball-side surface is set so as to be less than the mean reflectance on the object-side surface in the wavelength band of 400 to 440 nm, low UV reflection on the eyeball-side surface, which is the back surface, can be achieved.

A multilayer film on each surface of the spectacle lens includes one or more high refractive index layers and one or more low refractive index layers, and the total number of layers is preferably 10 or less (preferably 9 or less, more preferably 8 or less).

Furthermore, the following configuration may be adopted.

In a purple region (400 to 440 nm) to be particularly blocked among rays in the blue region described in Patent Literature 1, the sum of the mean reflectances on both surfaces may be set to a value of 20.0% or more (preferably more than 20.0%, more preferably 25% or more). That is, the reflectance may be locally increased in the purple region.

In an ultraviolet region or on a low wavelength side of the purple region (360 to 400 nm), the sum of the mean reflectances on both surfaces may be set to a value of 6.0% or less (preferably less than 6.0%, more preferably 5.0% or less). That is, the reflectance may be locally reduced contrary to the case of the purple region (400 to 440 nm).

Furthermore, on a high wavelength side of the blue wavelength region or in a red region (480 to 680 nm), the sum of the mean reflectances on both surfaces may be set to a value of 2.0% or less (preferably less than 2.0%, more preferably 1.5% or less). In order to achieve transmission of visible light, the reflectance may be reduced particularly locally in a main wavelength band of visible light.

Specific matters other than the above matters will be described below.

[Details of Configuration of Spectacle Lens According to an Aspect of the Present Disclosure]

In the spectacle lens, the multilayer film formed on each of the eyeball-side surface and the object-side surface of the lens substrate can impart the above reflection spectral characteristic to the spectacle lens. The multilayer film is formed on a surface of the lens substrate directly or indirectly through one or more other layers. The lens substrate is not particularly limited, and examples thereof include glass, a styrene resin including a (meth)acrylic resin, a polycarbonate resin, an allyl resin, an allyl carbonate resin such as diethyleneglycol bis(allylcarbonate) resin (CR-39), a vinyl resin, a polyester resin, a polyether resin, a urethane resin obtained through reaction between an isocyanate compound and a hydroxy compound such as diethylene glycol, a thiourethane resin obtained through reaction between an isocyanate compound and a polythiol compound, and a transparent resin obtained by curing a polymerizable composition containing a (thio) epoxy compound having one or more intermolecular disulfide bonds. In addition, inorganic glass can also be used. Note that the lens substrate may be undyed (a colorless lens) or dyed (a dyed lens). The refractive index of the lens substrate is, for example, approximately 1.60 to 1.75. Provided that the refractive index of the lens substrate is not limited thereto but may be within the above range or deviate therefrom.

The spectacle lens can be various lenses such as a monofocal lens, a multifocal lens, and a progressive addition lens. The type of the lens is determined depending on the shapes of both surfaces of the lens substrate. A surface of the lens substrate may be a convex surface, a concave surface, or a flat surface. In a general lens substrate and spectacle lens, the object-side surface is a convex surface, and the eyeball-side surface is a concave surface. However, the present disclosure is not limited thereto.

The multilayer film for imparting the above reflection spectral characteristic may be provided on a surface of the lens substrate directly or indirectly through one or more other layers. Examples of a layer which can be formed between the lens substrate and the multilayer film include a hard coat layer (hereinafter, also referred to as "hard coat"). By forming a hard coat layer, it is possible to impart flaw resistance (abrasion resistance) to the spectacle lens and to improve durability (strength) of the spectacle lens. For details of the hard coat layer, for example, paragraphs 0025 to 0028 and 0030 of JP 2012-128135 A can be referred to. A primer layer may be formed between the lens substrate and the coat in order to enhance adhesion. For details of the primer layer, for example, paragraphs 0029 and 0030 of JP 2012-128135 A can be referred to.

The multilayer film formed on each of the eyeball-side surface and the object-side surface of the lens substrate is not particularly limited as long as the multilayer film can impart the above-described reflection spectral characteristic to the spectacle lens surfaces having the multilayer films. Such a multilayer film can be preferably formed by sequentially building up a high refractive index layer and a low refractive index layer. More specifically, the multilayer film can be formed by determining the film thickness of each layer through optical simulation by a known method based on a refractive index of a film material for forming the high refractive index layer and the low refractive index layer and the wavelength of light to be reflected and light the reflection of which is to be reduced, and then sequentially building up the high refractive index layer and the low refractive index layer under film formation conditions determined such that the determined film thickness is achieved. A film forming material may be an inorganic material, an organic material, or an organic-inorganic composite material, and is preferably an inorganic material from a viewpoint of film formation and ease of availability. By adjusting the type of the film forming material, a film thickness, building order, or the like, it is possible to control the reflection spectral characteristic to each of blue light, ultraviolet rays, green light, and red light.

Examples of a high refractive index material for forming the high refractive index layer include one type of oxide selected from the group consisting of zirconium oxide (for example, $ZrO_2$), tantalum oxide ($Ta_2O_5$), titanium oxide (for example, $TiO_2$), aluminum oxide ($Al_2O_3$), yttrium oxide (for example, $Y_2O_3$), hafnium oxide (for example, $HfO_2$), and niobium oxide (for example, $Nb_2O_5$), and a mixture of two or more types of oxides selected therefrom. Meanwhile, examples of a low refractive index material for forming the low refractive index layer include one type of oxide or fluoride selected from the group consisting of silicon oxide (for example, $SiO_2$), magnesium fluoride (for example, $MgF_2$), and barium fluoride (for example, $BaF_2$), and a mixture of two or more types of oxides and fluorides selected therefrom. Note that in the above examples, oxide and fluoride are expressed in a stoichiometric composition for convenience, but oxide or fluoride in which oxygen or fluorine is deficient or excessive as compared to the stoichiometric composition can also be used as the high refractive index material or the low refractive index material.

The film thickness of each layer included in the multilayer film can be determined through optical simulation as described above. Examples of a layer configuration of the multilayer film include:

a configuration in which a first layer (low refractive index layer), a second layer (high refractive index layer), a third layer (low refractive index layer), a fourth layer (high refractive index layer), a fifth layer (low refractive index layer), a sixth layer (high refractive index layer), and a seventh layer (low refractive index layer) are layered in this order from a lens substrate side to a lens outermost side; and a configuration in which a first layer (high refractive index layer), a second layer (low refractive index layer), a third layer (high refractive index layer), a fourth layer (low refractive index layer), a fifth layer (high refractive index layer), and a sixth layer (low refractive index layer) are layered in this order from the lens substrate side to the lens outermost side. Examples of a preferable combination of a low refractive index layer and a high refractive index layer include a combination of a coat including silicon oxide as a principal component and a coat including zirconium oxide as a principal component, and a combination of a coat including silicon oxide as a principal component and a coat including niobium oxide as a principal component. Preferable examples of the multilayer film include a multilayer film including at least one stack in which these two coats are adjacent to each other.

Each of the layers is preferably a coat including the above-described high refractive index material or low refractive index material as a principal component. Here, the principal component is a component which accounts for the largest part of the coat and generally accounts for approximately 50 to 100% by mass, or furthermore 90 to 100% by mass with respect to the total amount. Such a coat can be formed by film formation using a film forming material including the above material as a principal component (for example, a vapor deposition source). Note that the principal component of the film forming material is similar to the above. The coat and the film forming material may include a minute amount of impurities which are inevitably mixed, and may include another component such as another inorganic substance or a known additive component which supports film formation as long as the component does not impair the function of the principal component. The film formation can be performed by a known film formation method, and is preferably performed by vapor deposition from a viewpoint of ease of the film formation. The vapor deposition in the present disclosure includes a dry method such as a vacuum vapor deposition method, an ion plating method, or a sputtering method. In the vacuum vapor deposition method, an ion beam assist method for emitting an ion beam simultaneously with vapor deposition may be used.

The multilayer film can also include, in addition to the above-described high refractive index layer and low refractive index layer, a coat including a conductive oxide as a principal component, preferably one or more conductive oxide layers formed by vapor deposition using a vapor deposition source including a conductive oxide as a principal component at an arbitrary position in the multilayer film. As the conductive oxide, various conductive oxides generally known as transparent conductive oxides, such as indium oxide, tin oxide, zinc oxide, titanium oxide, or composite oxide thereof, are preferably used from a viewpoint of transparency of the spectacle lens. Particularly preferable examples of the conductive oxide include tin oxide and indium-tin oxide (ITO) from viewpoints of transparency and conductivity. By including the conductive oxide layer, it is possible to prevent adherence of dust to the charged spectacle lens.

A functional film can be further formed on the multilayer film. Examples of such a functional film include various functional films such as a water repellent or hydrophilic antifouling film, an anti-fogging film, a polarizing film, and a photochromic film. A known technique can be applied to any of these functional films without any restriction.

[Spectacles According to an Aspect of the Present Disclosure]

According to another aspect of the present disclosure, it is possible to provide spectacles including the above spectacle lens according to an aspect of the present disclosure and a frame equipped with the spectacle lens. The spectacle lens has been described above in detail. A known technique can be applied to other components of the spectacles without any restriction.

less lens) in which both surfaces had been optically finished and subjected to hard coating in advance, the object-side surface was a convex surface, and the eyeball-side surface was a concave surface, a multilayer vapor deposition film having seven layers in total was sequentially formed by ion assisted deposition using an oxygen gas ($O_2$) and a nitrogen gas ($N_2$) as assist gases.

On the hard coat surface on the concave surface side (eyeball side), a multilayer vapor deposition film having seven layers in total was also layered by the ion assisted deposition under similar conditions, and a spectacle lens was thus obtained.

In the present Example, the multilayer vapor deposition film was formed such that, on each side of the convex surface side and the concave surface side, a first layer, a second layer . . . were layered in this order from the lens substrate side (hard coat side) to the spectacle lens surface and the outermost layer on the spectacle lens surface side was to be a seventh layer using the vapor deposition sources illustrated in Table 1. In the present Example, the vapor deposition sources formed of the following oxides were used except for impurities which may be inevitably mixed. In the present Example, the reflection spectral characteristic was controlled by changing the film thicknesses of the following one or more layers.

Table 1 below illustrates the film thickness of the multilayer film on each of the object-side surface and the eyeball-side surface and vapor deposition conditions (current (mA) and voltage (V) which are ion gun conditions, and $O_2$ (cc) and $N_2$ (cc) which are assist gas introduction amounts) in addition to the vapor deposition source.

TABLE 1

| | Vapor deposition source | Film thickness | | Ion gun condition | | Assist gas introduction amount | |
|---|---|---|---|---|---|---|---|
| | | Object-side | Eyeball-side | Current (mA) | Voltage (V) | O2 (cc) | N2 (cc) |
| First layer | SiO2 | 45.0 | 45.0 | 210 | 420 | 10 | 10 |
| Second layer | ZrO2 | 6.5 | 8.0 | | 320 | | |
| Third layer | SiO2 | 245.0 | 285.0 | | 420 | | |
| Fourth layer | ZrO2 | 31.0 | 18.0 | | 320 | | |
| Fifth layer | SiO2 | 20.0 | 220.0 | | 420 | | |
| Sixth layer | ZrO2 | 133.0 | 98.5 | | 320 | | |
| Seventh layer | SiO2 | 94.0 | 83.0 | | 420 | | |

[Method for Manufacturing Spectacle Lens According to an Aspect of the Present Disclosure]

According to another aspect of the present disclosure, it is also possible to provide a method for manufacturing the above spectacle lens according to an aspect of the present disclosure.

EXAMPLES

The present disclosure will be further described with Examples below, but the present disclosure is not limited to aspects described in the Examples. In the following description, the refractive index is a refractive index at a wavelength of 500 nm.

Example 1

On a hard coat surface on a convex surface side (object side) of a plastic lens substrate (trade name: HL manufactured by HOYA Corporation, refractive index: 1.50, color- In the optical center of each of the object-side surface (convex surface side) and the eyeball-side surface (concave surface side) of the spectacle lens of the present Example, a spectroscopic reflection spectrum in a wavelength range of 280 to 780 nm was measured (measurement pitch: 1 nm) using a spectrophotometer F10-AR manufactured by Filmetrics. In order to suppress reflection from a non-measurement surface, the non-measurement surface was painted with lusterless black as described in Section 5.2 of JIS T 7334.

FIG. 1 is a diagram illustrating spectral reflection spectra obtained by measurement on the object-side surface and the eyeball-side surface of the spectacle lens of Example 1.

Table 2 below summarizes the mean reflectance on the object-side surface, the mean reflectance on the eyeball-side surface, and the sum of the mean reflectances on both surfaces for each wavelength band.

TABLE 2

| Wavelength band (nm) | Mean reflectance on object-side surface (%) | Mean reflectance on eyeball-side surface (%) | Sum of mean reflectances on both surfaces (%) |
| --- | --- | --- | --- |
| 360-400 | 2.18 | 3.32 | 5.50 |
| 400-440 | 7.54 | 16.07 | 23.61 |
| 480-680 | 0.78 | 0.33 | 1.11 |

In the present Example, as illustrated in Table 2, each condition for the mean reflectance in the spectacle lens according to an aspect of the present disclosure is satisfied. A wearer wore the spectacle lens of the present Example. As a result, the wearer did not recognize multiple-reflected light in the blue region.

In addition to the effect related to multiple-reflected light, the following advantages can also be received. That is, as illustrated in FIG. 1, an effect of blocking rays in the purple region (400 to 440 nm) to be particularly blocked among rays in the blue region described in Patent Literature 1 is ensured. Furthermore, transmission of visible light can be sufficiently ensured. Furthermore, the sum of the luminous reflectances on both surfaces in the optical multilayer film at this time is 1.11%. This indicates that reflection is sufficiently suppressed on both surfaces, and a favorable wearing feeling is achieved as the spectacle lens.

The embodiment disclosed herein is an example in every respect and should not be restrictively understood. The scope of the present disclosure is described not by the above description but by claims, and includes all modifications equivalent to and in claims.

The present disclosure is useful in the field of manufacturing a spectacle lens and spectacles.

The invention claimed is:

1. A spectacle lens comprising multilayer films on both surfaces of a lens substrate, wherein
   a sum of mean reflectances on both surfaces of the spectacle lens in a wavelength band of 400 to 440 nm is 20.0% or more,
   a reflectance on each surface of the spectacle lens has at least one maximum value in the wavelength band of 400 to 440 nm,
   there is a difference between the mean reflectance on one surface of the spectacle lens and the mean reflectance on the other surface in the wavelength band of 400 to 440 nm, and
   the sum of mean reflectances on both surfaces of the spectacle lens in a wavelength band of 360 to 400 nm is 6.0% or less.

2. The spectacle lens according to claim 1, wherein
   a ratio of the mean reflectance on one surface of the spectacle lens to the mean reflectance on the other surface is more than 0 and 0.9 or less in the wavelength band.

3. The spectacle lens according to claim 1, wherein
   the mean reflectance on the object-side surface of the spectacle lens is less than the mean reflectance on the eyeball-side surface in the wavelength band.

4. The spectacle lens according to claim 1, wherein a sum of the mean reflectances on both surfaces of the spectacle lens in a wavelength band of 500 to 570 nm is 1.0% or less.

5. The spectacle lens according to claim 1, wherein a sum of luminous reflectances on both surfaces of the spectacle lens is 2.0% or less.

6. The spectacle lens according to claim 5, wherein a sum of the maximum values out of the reflectances on both surfaces of the spectacle lens is 60.0% or less.

7. The spectacle lens according to claim 1, wherein a multilayer film on each surface of the spectacle lens includes one or more high refractive index layers and one or more low refractive index layers, and the total number of layers is 10 or less.

* * * * *